(12) United States Patent
Jian et al.

(10) Patent No.: US 12,056,703 B2
(45) Date of Patent: Aug. 6, 2024

(54) IDENTITY RECOGNITION METHOD AND APPARATUS BASED ON DYNAMIC RASTERIZATION MANAGEMENT, AND SERVER

(71) Applicant: XUNTENG (GUANGDONG) TECHNOLOGY CO., LTD., Guangzhou (CN)

(72) Inventors: Weiming Jian, Guangzhou (CN); Aiping Pi, Guangzhou (CN); Huagui Liang, Guangzhou (CN); Feiying Huang, Guangzhou (CN); Qiurong Chen, Guangzhou (CN)

(73) Assignee: XUNTENG (GUANGDONG) TECHNOLOGY CO., LTD., Guangzhou (CN)

( * ) Notice: Subject to any disclaimer, the term of this patent is extended or adjusted under 35 U.S.C. 154(b) by 384 days.

(21) Appl. No.: 17/418,766

(22) PCT Filed: Dec. 12, 2019

(86) PCT No.: PCT/CN2019/124909
§ 371 (c)(1),
(2) Date: Jun. 25, 2021

(87) PCT Pub. No.: WO2020/135081
PCT Pub. Date: Jul. 2, 2020

(65) Prior Publication Data
US 2022/0058656 A1 Feb. 24, 2022

(30) Foreign Application Priority Data
Dec. 26, 2018 (CN) .......................... 201811608294.0

(51) Int. Cl.
*G06Q 20/40* (2012.01)
*G06Q 20/38* (2012.01)
(Continued)

(52) U.S. Cl.
CPC ...... *G06Q 20/40145* (2013.01); *G06Q 20/389* (2013.01); *G06Q 20/4015* (2020.05); *H04W 4/021* (2013.01); *H04W 4/029* (2018.02)

(58) Field of Classification Search
CPC .......... G06Q 20/40145; G06Q 20/389; G06Q 20/4015; H04W 4/021; H04W 4/029
See application file for complete search history.

(56) References Cited

U.S. PATENT DOCUMENTS

2008/0010025 A1 1/2008 Farnet et al.
2009/0275850 A1 11/2009 Mehendale et al.
(Continued)

FOREIGN PATENT DOCUMENTS

| CN | 103106393 A | 5/2013 |
|---|---|---|
| CN | 104463589 A | 3/2015 |

(Continued)

OTHER PUBLICATIONS

International Search Report and Written Opinion for corresponding International Application No. PCT/CN2019/124909 dated Feb. 27, 2020.

*Primary Examiner* — Vernal U Brown
(74) *Attorney, Agent, or Firm* — Steven Koehler; Westman, Champlin & Koehler, P.A.

(57) ABSTRACT

An identity identification method comprises: tracking a current location of each user to determine a current grid area each user is located; receiving an identification request sent by a service terminal; the identification request comprises first location information and biological characteristic information of a target object; determining a first grid area where the service terminal is located based on the first location information; obtaining biological characteristic information of each user with respective current grid area being the first grid area;

(Continued)

completing an identity identification according to the biological characteristic information of the target object and the biological characteristic information of each user in the first grid area. A device and server based on dynamic rasterization management are further provided.

16 Claims, 6 Drawing Sheets

(51) Int. Cl.
    *H04W 4/021*     (2018.01)
    *H04W 4/029*     (2018.01)

(56) References Cited

U.S. PATENT DOCUMENTS

2018/0189769 A1*   7/2018   Narasimhan ............ G06Q 20/20
2018/0349912 A1*  12/2018   Fiterman ............ G06Q 20/3221

FOREIGN PATENT DOCUMENTS

| | | |
|---|---|---|
| CN | 104599126 B | 4/2017 |
| CN | 108171512 A | 6/2018 |
| CN | 108171514 A | 6/2018 |
| CN | 109087502 A | 12/2018 |
| CN | 109685515 A | 4/2019 |
| JP | 2000113197 A | 4/2000 |

* cited by examiner

IDENTITY RECOGNITION METHOD AND APPARATUS BASED ON DYNAMIC RASTERIZATION MANAGEMENT, AND SERVER

CROSS-REFERENCES TO RELATED APPLICATIONS

This application is a Section 371 National Stage Application of International Application No. PCT/CN2019/124909, filed Dec. 12, 2019 and published as WO 2020/135081 on Jul. 2, 2020, and further claims priority to Chinese Patent Application Serial No. 201811608294.0, filed Dec. 26, 2018, the entire content of which is incorporated by reference in this application.

TECHNICAL FIELD

This application relates to the field of identity identification technology, and in particular to an identity identification method based on dynamic rasterization management, apparatus and server therefor.

TECHNICAL BACKGROUND

With the continuous development of network technology and automated device technology, identity identification technology has also developed, and identity identification technology has been applied to many services such as mobile payment and identity authentication. At present, the existing identity identification technology requires the user to provide information such as a password, a two-dimensional code, or an identity document etc., so that the service terminal may identify the user's identity based on the above-mentioned information. However, when performing identity identification in this way, the identification process is cumbersome and there are certain risks.

SUMMARY OF THE INVENTION

In view of this, the purpose of this application is to provide an identity identification method, based on dynamic rasterization management, apparatus and server therefor, which may further simplify the process of identity identification, and improve the user experience of the user during identity identification, and at the same time, may reduce the existing risk of identity identification.

In a first aspect, the embodiments of the present application provide an identity identification method based on dynamic rasterization management, comprising: tracking a current location of each user to determine a current grid area each user is located; receiving an identification request sent by a service terminal; wherein the identification request comprises first location information and live body biological characteristic information of a target object; determining a first grid area where the service terminal is located based on the first location information; obtaining biological characteristic information of each user with respective current grid area being the first grid area; completing an identity identification according to the live body biological characteristic information of the target object and the biological characteristic information of each user in the first grid area.

In combination with the first aspect, the embodiments of the present application provide a first possible implementation method of the first aspect, wherein the steps of completing the identity identification according to the live body biological characteristic information of the target object and the biological characteristic information of each user in the first grid area comprises: determining whether the live body biological characteristic information of the target object is directly from a real live body; if yes, performing a biological characteristic matching on the target object and each user in the first grid area according to the live body biological characteristic information of the target object and the biological characteristic information of each user in the first grid area; determining whether the biological characteristic matching is successful matched; if not, obtaining each second grid area adjacent to the first grid area, and obtaining biological characteristic information of each user in each of the second grid areas; completing the identity identification according to the live body biological characteristic information of the target object and the biological characteristic information of each user in each second grid area.

In combination with the first possible implementation method of the first aspect, the embodiments of the present application provide a second possible implementation method of the first aspect, wherein the step of completing the identity identification according to the live body biological characteristic information of the target object and the biological characteristic information of each user in each second grid area comprises: performing the biological characteristic matching on the target object and each user in each second grid area according to the live body biological characteristic information of the target object and the biological characteristic information of each user in each the second grid area; determining whether the biological characteristic matching is successful matched; when the biological characteristic matching is successful matched, determining whether a user successfully matched is unique; when the user successfully matched is unique, determining the matched user as the target object, and completing the identity identification.

In combination with the second possible implementation method of the first aspect, the embodiments of the present application provide a third possible implementation method of the first aspect, wherein the method further comprises: when the user successfully matched is not unique, sending an identity confirmation request to an associated terminal of each user successfully matched; when receiving at least one identity information sent by the associated terminal of each user successfully matched for the identity confirmation request, determining the identity information sent by the associated terminal of each user to obtain a determination result; completing the identity identification according to the determination result.

In combination with the first aspect, the embodiments of the present application provide a fourth possible implementation method of the first aspect, wherein the method further comprises: after completing the identity identification, sending an identity identification result and a service request to a payment system, so that the payment system searches for a payment account corresponding to the identity identification result, and completes a payment operation based on the payment account and the service request, and returns a result of the payment operation; receiving the result of the payment operation returned by the payment system, generating and sending an invoice service request according to the payment operation to an invoice system, so that the invoice system generates a payment invoice, and sending the payment invoice by email to an email address designated by the target object, and/or to the service terminal.

In combination with the first aspect, the embodiments of the present application provide a fifth possible implementation method of the first aspect, wherein the method further comprises: after completing the identity identification, sending an identity identification result and a service request to an identity authentication system, so that the identity authentication system converts the identity identification result into personal identity information, and completing an identity authentication based on the personal identity information and the service request.

In combination with the third possible implementation method of the first aspect, the embodiments of the present application provide a sixth possible implementation method of the first aspect, wherein the method further comprises: generating an identity identification log, and sending the identity identification log to the associated terminal of the target object to prompt a completion of the identity identification of the target object.

In combination with the first aspect, the embodiments of the present application provide a seventh possible implementation method of the first aspect, wherein the method further comprises: when the biological characteristic information is a human face biological characteristic information, the human face biological characteristic information comprises the live body human face biological characteristic information of the target object or combines the live body human face biological characteristic information and the facial expression information of the target object.

In a second aspect, the embodiments of the present application further provide an identity identification device based on dynamic rasterization management, comprising: a tracking module configured to track a current location of each user to determine a current grid area each user is located; a receiving module configured to receive an identification request sent by a service terminal; wherein the identification request comprises first location information and live body biological characteristic information of a target object; a grid determining module configured to determine a first grid area where the service terminal is located based on the first location information; an information acquisition module configured to obtain biological characteristic information of each user with respective current grid area being the first grid area; an identity confirmation module configured to complete an identity identification according to the live body biological characteristic information of the target object and the biological characteristic information of each user in the first grid area.

In a third aspect, the embodiments of the present application further provide a server, comprising a processor and a memory; a computer program is stored on the memory, and the computer program executes a method such as the method of any one of the first aspect to the seventh possible implementation method of the first aspect.

In a fourth aspect, the embodiments of the present application further provide a computer storage medium, characterized in that, it is configured to store computer software instructions used in the method of any one of the first aspect to the seventh possible implementation method of the first aspect.

The embodiments of the application bring the following beneficial effects:

The identity identification method based on dynamic rasterization management, device and server therefor, provided by the embodiments of the application track a current location of a user in real time to determine the current grid area where each user is located, and receive an identification request sent by a service terminal to obtain first location information, and determine a first grid area where the service terminal is located based on the first location information, and then obtain the biological characteristic information of all users whose current grid area is the first grid area, and then according to the live body biological characteristic information of the target object and the biological characteristic information of the above-mentioned users complete the identity identification. The embodiments of this application identify the user's identity through the user's live body biological characteristic information, without the need for the user to provide information such as passwords, two-dimensional codes, or identification documents, which may effectively simplify the process of identity identification and improve the user's sense of experience when performing identity identification. In addition, because the user does not need to provide the above information, it may reduce the risk of fraudulent use of passwords and two-dimensional codes and loss of identity documents etc., and further improve the security of identity identification. At the same time, the use of live body biological characteristic information may further improve the security of identity identification.

Other features and advantages of the present application will be described in the following description, and partly become obvious from the description or understood by implementing the present application. The purpose and other advantages of the application are realized and obtained by the structures specifically pointed out in the description, claims and figures.

In order to make the above-mentioned objectives, features and advantages of the present application more obvious and understandable, the preferred embodiments and accompanying figures are described in detail as follows.

DESCRIPTION OF THE DRAWINGS

In order to more clearly illustrate the specific embodiments of the application or the technical solutions in the prior art, the following will briefly introduce the figures that need to be used in the description of the specific embodiments or the prior art. Obviously, the figures in the following description are some embodiments of the present application. For those of ordinary skill in the art, other figures may be obtained based on these figures without any inventive work.

DESCRIPTION

In order to make the purpose, technical solutions and advantages of the embodiments of this application clearer, the technical solutions of this application will be described clearly and completely in conjunction with the accompanying figures. Obviously, the described embodiments are part of the embodiments of this application, not all of the embodiments. Based on the embodiments in this application, all other embodiments obtained by those of ordinary skill in the art without inventive work shall fall within the protection scope of this application.

At present, identity identification technology has been applied to many services such as mobile payment and identity authentication etc. Existing identity identification technology requires users to provide information such as passwords, two-dimensional codes or identification documents, so that a service terminal may identify the user's identity based on the above information, and then complete mobile payment and identity authentication. However, for mobile payment, its payment account is usually bound with a mobile phone account, so that others may fraudulently use the payment account by stealing the mobile phone account, causing property damage to the user; for identity authentication, the user is required to provide an identification document to complete the identity authentication. When the identification document is not carried, it will affect the user experience. Based on this, the identity identification method based on dynamic rasterization management, device and server therefor, provided by the embodiments of the present application may further simplify the process of identity identification and improve the user experience of the user during identity identification, and at the same time it may reduce the risk of identity identification; when the biological characteristic information is human face biological characteristics, the use of facial expression information may greatly prevent the risk of fraudulent use of identity without the will of the person, and may effectively prevent identity confusion of twins and other similar people.

Figure 1:
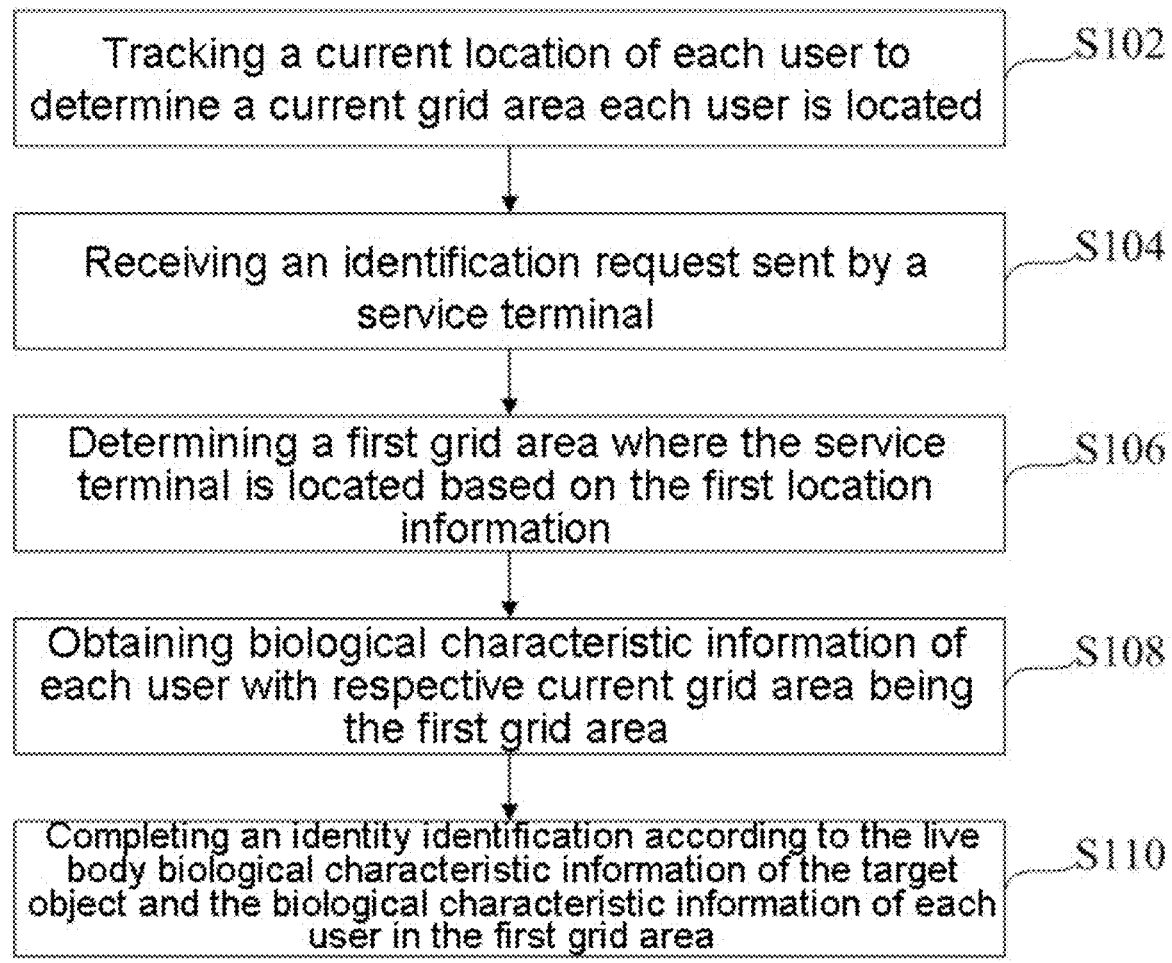
FIG. 1 is an illustrative flowchart of an identity identification method based on dynamic rasterization management provided by an embodiment of the application.

In order to facilitate the understanding of this embodiment, firstly, an identity identification method based on dynamic rasterization management disclosed in the embodiment of the present application will be introduced in detail. Referring to an illustrative flow process of an identity identification method based on dynamic rasterization management of FIG. 1, the method comprises the following steps:

Step S102: tracking a current location of each user to determine a current grid area each user is located.

Specifically, firstly, a certain area is divided into multiple grid areas, and a corresponding grid server is set in each grid area, and then each grid area is divided into multiple sub-areas, and even each sub-area may be divided into multiple sub-sub-areas. Preferably, for an area with a large area and sparse population, multiple grids may be set in one grid server to improve the utilization rate of the grid server. In order to facilitate real-time determination of the current grid area where the user is located, the current location of the user is tracked. Specifically, the location information sent by the user's associated terminal is acquired in real time, which may be based on one or more positioning technologies such aBDS (BeiDou Navigation Satellite System), GPS (Global Positioning System), LBS (Location Based Service, base station positioning), AGPS (Assisted Global Positioning System), GSM (Global System for Mobile communications), IP (Internet Protocol) address positioning, WIFI (Wireless Fidelity, mobile hotspot) and gyroscope positioning etc., to locate the location of the user's associated terminal, and then obtain the user's location information, and determine the current grid area where the user is located according to the user's location information; In addition to mobile phones, the user's associated terminal devices may also be personal mobile devices such as laptops, tablets, smart watches, smart bracelets, smart glasses, smart earplugs, and smart button-type devices.

It is considered that when the target object is located in a densely populated area, the user needs to be more accurately positioned; when the target object is located in a sparsely populated area, precise positioning is not required. Specifically, when the user density in the first grid area is high, a high-precision location request is generated, so that the associated terminal of the target user returns high-precision location information based on the high-precision location request, and sends the high-precision location information to the grid server corresponding to the first grid area, so that the grid server determines the sub-grid area or sub-sub-grid area where the target object is located according to high-precision location information; when the user density of the first grid area is smaller, a low-precision location request may be generated, so that the associated terminal of the target user returns low-precision location information based on the low-precision location request. In addition, through this method, the associated terminal of the target object does not need to initiate the high-power high-precision positioning service for a long time, but only needs to initiate it when a high-precision location request is received, which may minimize the power consumption of the positioning service.

Step S104: receiving an identification request sent by a service terminal.

Among them, the service terminal may be a mobile payment terminal and an identity authentication terminal. Specifically, a mobile payment terminal may include cash registers, POS (point of sale) machines, self-service payment machines, smart scanners, handheld devices, tablet computers, smart TVs, mobile phones, claw machines, game machines, and self-service payment machines, self-service recharge machines and smart payment equipment etc.; identity authentication terminal may include self-service terminals (e-government self-service terminals, e-banking self-service terminals, e-tax self-service terminals, hotel check-in self-service terminals, ATM (Automatic Teller Machine, automatic cash withdrawal) machines, queuing machines, number machines, self-service printing machines, self-service invoice machines, self-service ticket machines and self-service settlement machines etc.), shared equipment, intelligent robots, drones, identity authentication machines, member and VIP identification equipment, smart access control, smart video intercom equipment and smart gates etc.

When the service terminal handles the corresponding service, it generates an identification request, and the identification request includes the first location information and the biological characteristic information of the target object. The first location information is the location information where the service terminal is located. The location of the service terminal may be located through one or more positioning technologies such as manual setting, BDS, GPS, LBS, AGPS, IP address, and WIFI, to obtain the first location information of the service terminal. Further, the combined use of the above methods may obtain more accurate first location information where the service terminal is located.

Further, the biological characteristic information may be one or more of face information, iris information, sclera information, eye prints information, palm veins information, palm prints information, finger veins information, and voice prints information etc. The user's biological characteristic information is collected by installing corresponding biometric collection structures and pre-stored biological characteristic collection method on the service terminal. Preferably, the human face identification technology may be selected to obtain the user's identity characteristic information. As the accuracy of human face identification technology continues to improve, the current human face identification technology has been developed to a level of an error rate of one in ten million, so the accuracy of identity identification may be improved through the human face identification technology. With the use of live body human face identification technology, it may prevent others from impersonating users with mobile phone images, videos, photos, masks, and 3D (3 Dimensions) printed heads, and increase user safety. Further, taking into account that there will be two people who look exactly the same when they are brothers, sisters, twins, or not related by blood, that is, human faces are not unique, human face identification technology may also be combined with facial expression identification technology, and users may customize the expressions required for identity identification based on their own preferences, and despite the similar appearances, because the expressions are not the same, it may further prevent the identity of similar-looking users such as twins from being confused.

Step S106: determining a first grid area where the service terminal is located based on the first location information.

In an implementation method, when the service request sent by the service terminal is received, the first grid area where the service terminal is located is determined according to the first location information through the dynamic rasterization management technology.

Step S108: obtaining biological characteristic information of each user with respective current grid area being the first grid area.

It is understandable that because the service terminal is located in the first grid area, and the location of the target user should not exceed a certain distance from the location of the service terminal, otherwise it will not be able to complete a series of operations such as collecting live body biological characteristic information; at the same time, in order to prevent remote fraudulent use, when the location of the target user is far away from the location of the service terminal, the identity identification cannot be completed. Therefore, it is preferable to obtain the biological characteristic information of the user in the first grid area.

Step S110: completing an identity identification according to the live body biological characteristic information of the target object and the biological characteristic information of each user in the first grid area.

First, it should be determined whether the biological characteristic information of the target object is directly from the real live body. When the biological characteristic information of the target object is not directly from the real live body, the identity authentication cannot be completed. If the live body identification is set on the service terminal, no service request is sent; if the live body identification is set on the server side, User Cannot be Found is sent to the service terminal at this time; when the live body biological characteristic information of the target object is directly from the real live body, the biological characteristic information of the target object is compared with the biological characteristic information of each user. When the comparison similarity threshold is higher than the pre-set threshold, the user is determined to be the target object, and the identity information corresponding to the user may be searched in the system.

When the biological characteristic information is human face information, the user corresponding to the target object may be found in the system by comparing the human face information of the target object and the aforementioned users, and then the identity information of the target object may be determined. Further, when human face identification technology and facial expression identification technology are combined, the biological characteristic information of the target object should include human face information and expression information, and the target object may be determined only when the human face information and expression information are matched successfully to prevent the risk of fraudulent use of identities without the willingness of the person, and further prevent the identity confusion of similar-looking users such as twins.

The identity identification method based on dynamic rasterization management provided by the embodiments of the application track a current location of a user in real time to determine the current grid area where each user is located, and receive an identification request sent by a service terminal to obtain first location information, and determine a first grid area where the service terminal is located based on the first location information, and then obtain the biological characteristic information of all users whose current grid area is the first grid area, and then according to the live body biological characteristic information of the target object and the biological characteristic information of the above-mentioned users complete the identity identification. The embodiments of this application identify the user's identity through the user's live body biological characteristic information, without the need for the user to provide information such as passwords, two-dimensional codes, or identification documents, which may effectively simplify the process of identity identification and improve the user's sense of experience when performing identity identification. In addition, because the user does not need to provide the above information, it may reduce the risk of fraudulent use of passwords and two-dimensional codes and loss of identity documents etc., and further improve the security of identity identification. At the same time, the use of live body biological characteristic information may further improve the security of identity identification.

Figure 2:
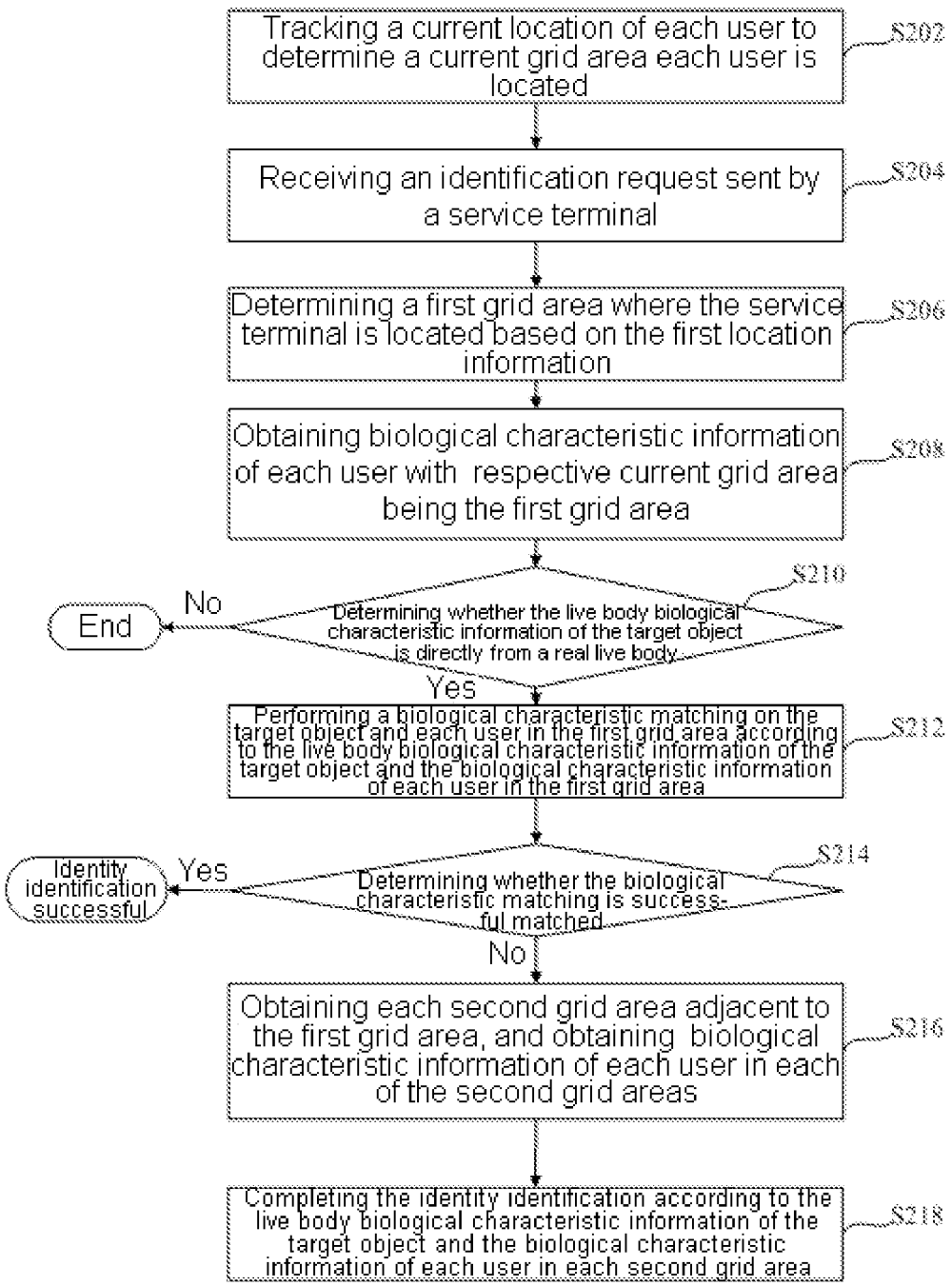
FIG. 2 is an illustrative flow chart of another identity identification method based on dynamic rasterization management provided by an embodiment of the application.

In order to facilitate the understanding of the above-mentioned embodiments, the embodiments of the present application also provide another identity identification method based on dynamic rasterization management. Referring to another illustrative flow process of an identity identification method based on dynamic rasterization management of FIG. 2, the method comprises the following steps:

Step S202: tracking a current location of each user to determine a current grid area each user is located.

Step S204: receiving an identification request sent by a service terminal.

Step S206: determining a first grid area where the service terminal is located based on the first location information.

Step S208: obtaining biological characteristic information of each user with respective current grid area being the first grid area.

Step S210: determining whether the live body biological characteristic information of the target object is directly from a real live body. If yes, go to step S212; if no, end.

In order to prevent others from impersonating their identity through photos, videos, etc., first check whether the identity information of the target object is directly from a real live body, if not, the identity identification is directly ended, and the identification failure information is returned to the service terminal.

Step S212: performing a biological characteristic matching on the target object and each user in the first grid area according to the live body biological characteristic information of the target object and the biological characteristic information of each user in the first grid area.

In one embodiment, the similarity value between the live body biological characteristic information of the target object and the biological characteristic information of each user in the first grid area may be calculated, and a similarity threshold value is pre-set. If and only if the similarity value is greater than the pre-set similarity threshold, the biological characteristic matching is successful.

Step S214: determining whether the biological characteristic matching is successful matched. If yes, the identification is completed; if no, step S216 is executed.

When the matching is successful, it indicates that there is a corresponding relationship of the target object in the above-mentioned user, and the information of the user successfully matched may be confirmed as the information of the target object, and the identity identification is completed. Further, it is determined whether the user successfully matched is unique, and if not, the identity of the target object needs to be further identified.

Step S216: obtaining each second grid area adjacent to the first grid area, and obtaining biological characteristic information of each user in each of the second grid area.

It is understandable that when the biological characteristic information of each user in the first grid area does not match, the target object may be divided into a grid area adjacent to the first grid area due to errors in the user location information. Therefore, each second grid area adjacent to the first grid area is obtained, and the biological characteristic information of each user in each second grid area is obtained for further biological characteristic matching.

Step S218: completing the identity identification according to the live body biological characteristic information of the target object and the biological characteristic information of each user in each second grid area.

The embodiment of the present application further provides the steps for completing the identity identification based on the live body biological characteristic information of the target object and the biological characteristic information of the user in each second grid area. For details, refer to the following steps:

(1) performing the biological characteristic matching on the target object and each user in each second grid area according to the live body biological characteristic information of the target object and the biological characteristic information of each user in each the second grid area.

(2) determining whether the biological characteristic matching is successful matched. If matching fails, the identity identification is ended, and an identity identification failure is returned to the service terminal.

(3) when the biological characteristic matching is successful matched, determining whether a user successfully matched is unique. It is understandable that the biological characteristic information of multiple users may be similar to that of the target object. Therefore, it is further determined whether multiple users are matched.

(4) when the user successfully matched is unique, determining the matched user as the target object, and completing the identity identification. If the biological characteristic information of only one user is similar to the target object, the user may be confirmed as the target object and identity identification is completed.

(5) when the user successfully matched is not unique, sending an identity confirmation request to an associated terminal of each user successfully matched. When multiple users are matched with similar biological characteristic information of the target object, further identity identification will be required. Specifically, an identity confirmation request may be sent to the associated terminal of each user successfully matched, so that each user returns identity confirmation information based on the identity confirmation request.

(6) when receiving at least one identity information sent by the associated terminal of each user successfully matched for the identity confirmation request, determining the identity information sent by the associated terminal of each user to obtain a determination result. Among them, the determination result may be that the information is wrong and the information is correct. It is understandable that for young children, elderly people, or people who are not suitable for carrying mobile phones due to physical reasons, they may be located through another person's mobile phone. Then, let a person own self to perform a face scan verification, and based on this, the associated terminal may send at least one first identity information.

(7) completing the identity identification according to the determination result. When the determination result is that the information is wrong, it means that the identity confirmation information returned by the associated terminal does not match the identity information of the target object; when the determination result is that the information is correct, the user of the associated terminal may be confirmed as the target object, and then the identity identification is completed.

If the user corresponding to the target object still cannot be matched at this time, the identity identification cannot be completed, and an identity identification failure is returned to the service terminal.

The identity identification method based on dynamic rasterization management provided by the embodiments of this application tracks a current position of the user in real time to determine the current grid area where each user is located, and in the identity identification process, first perform biological characteristic matching based on the first grid area where the service terminal is located, and in the case of unsuccessful matching, perform biological characteristic matching in adjacent areas to complete identity identification. In addition, during matching, first determine whether the biological characteristic information sent by the service terminal is directly from a real live body, so as to further prevent others from impersonating identity through photos and videos. The embodiments of this application identify the user's identity through the user's live body biological characteristic information, without the need for the user to provide information such as passwords, two-dimensional codes, or identification documents, which may effectively simplify the process of identity identification and improve the user's sense of experience when performing identity identification. In addition, because the user does not need to provide the above information, it may reduce the risk of fraudulent use of passwords and two-dimensional codes and loss of identity documents etc., and further improve the security of identity identification.

Further, an identity identification log is generated, and the identity identification log is sent to the associated terminal of the target object to prompt the completion of the identity identification of the target object. In order to inform the target object that the identity identification is completed, an identity identification log may be generated and sent to the associated terminal of the target object. At the same time, sending the identity identification log to the associated terminal of the target object also facilitates the subsequent query of the identity identification result of the target object.

Figure 3:
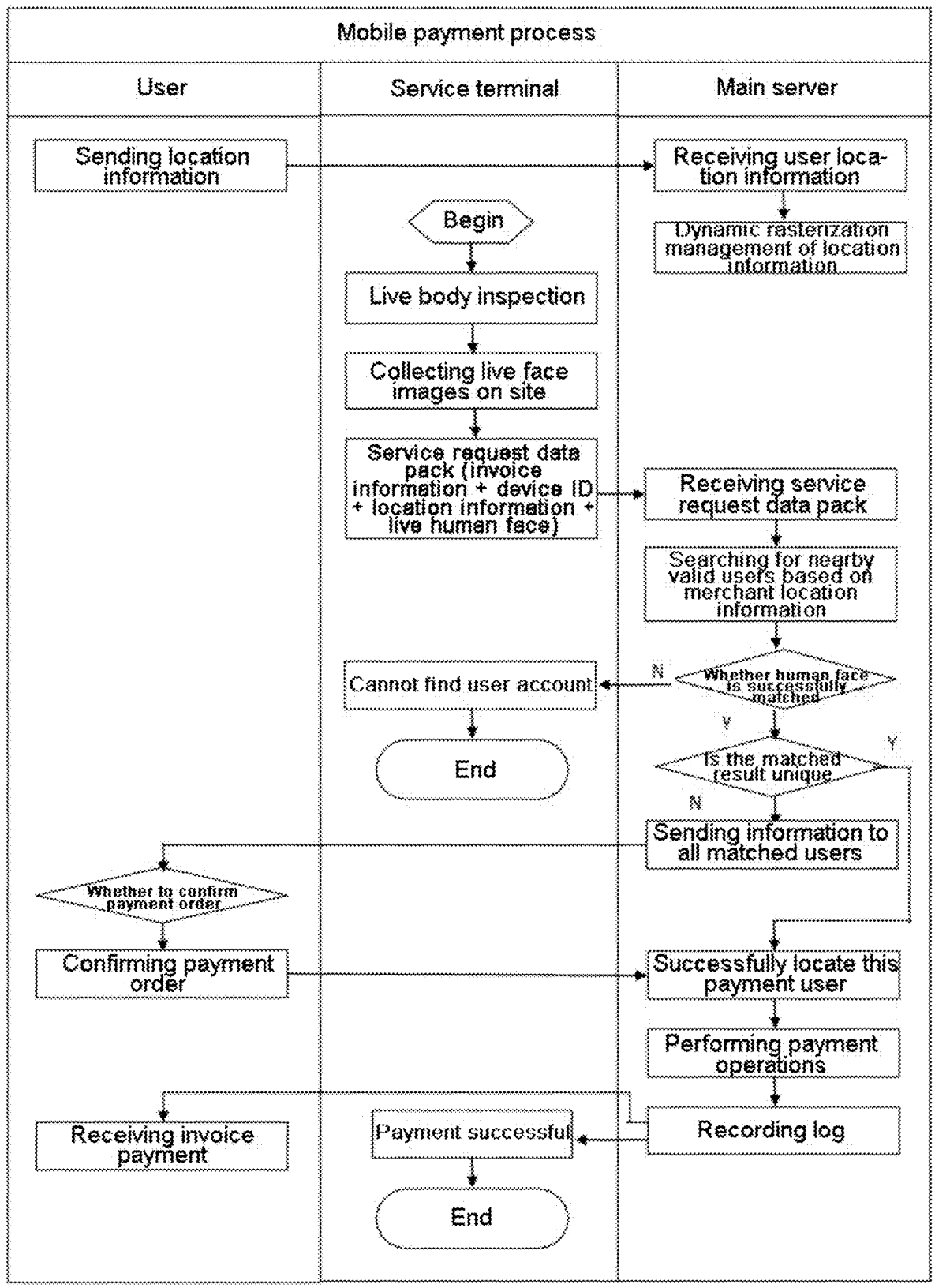
FIG. 3 is a flowchart of another identity identification method based on dynamic rasterization management provided by an embodiment of the application.

In order to facilitate the understanding of the above-mentioned embodiments, the embodiments of this application also provide another identity identification method based on dynamic rasterization management. Referring to another illustrative flow process of an identity identification method based on dynamic rasterization management of FIG. 3, the method comprises the following steps:

After completing the identity identification, sending an identity identification result and a service request to a payment system, so that the payment system searches for a payment account corresponding to the identity identification result, and completes a payment operation based on the payment account and the service request, and returns a result of the payment operation; then receiving the result of the payment operation returned by the payment system, generating and sending an invoice service request according to the payment operation to an invoice system, so that the invoice system generates a payment invoice, and sending the payment invoice by email to an email address designated by the target object or to the service terminal for on-site invoice printing.

Specifically, the user's associated terminal sends the user's location information to the system in real time, so that the system updates the grid area where the user is located based on the user's location information. When a user spends, the service terminal of the merchant first performs a live body detection on the user, and then collects the user's live body human face image, and generates a service request data pack based on the user's billing information, merchant device ID, merchant location information, and live body human face, and sends the service request data pack to the system. After receiving the service request data pack, the system obtains the corresponding valid user according to the merchant's device ID in the service request data pack, and compares the live body human face in the service request data pack with the system's human face for matching. When the matching is unsuccessful, the merchant's service terminal will return "User Account Not Found" and end the payment; when the matching is successful, it will be determined whether the matching result is unique, and if it is unique, setting the effective user successfully matched as the current payment user; if it is not unique, sending information to all users successfully matched, and each user will determine whether to confirm the payment of the bill, so as to locate the current payment user, and then perform the payment operation according to the current payment user, and record a log, and then send "Payment Successful" to the service terminal of the merchant, and send a "Payment Invoice" to the user's associated terminal. If the user needs to an issued invoice, after the payment is completed, an invoice service request is generated and sent to the invoicing system, so that the invoicing system generates a payment invoice, and the payment invoice is emailed to the user's designated email address or sent to the service terminal for on-site invoice printing.

Further, a corresponding payment log is generated, and the payment log is sent to the associated terminal of the target object to prompt the target object to complete the payment. In order to inform the target object that the payment is completed, a payment log may be generated and sent to the associated terminal of the target object. At the same time, sending the payment log to the associated terminal of the target object also facilitates the subsequent query of the payment result by the target object.

The embodiment of this application uses human face identification technology to identify the user's identity and complete the payment operation. This process only requires the user's cooperation to collect human face information, without the need to enter a payment password or provide a two-dimensional code to the merchant, which further simplifies the user's payment process. In addition, because the user account is not bound to the user's mobile phone number, the risk of stealing the user account through the mobile phone number is reduced, and the security of the user account is improved.

Preferably, when the biological characteristic information is human face biological characteristics, the human face biological characteristic information includes the live body human face biological characteristic information of the target object or combining the live body human face biological characteristic information with the facial expression information of the target object, that is, the facial expression information of the target object may be included in the human face biological characteristic information. When performing live body detection on a user, a combination of live body human face identification technology and facial expression identification technology is used. In a specific implementation, the user is required to cooperate to make corresponding expressions. Among them, live body human face identification technology includes live body human face identification technology and human face identification technology. When performing identity identification based on the live body human face biological characteristic information including the facial expression information of the target object, firstly use the live body human face identification technology to determine whether the target object is a real person or not, and then the user corresponding to the target object is matched through the human face identification technology, and then the facial expression information is matched through the facial expression identification technology, and the identity identification is completed according to the matching result.

Furthermore, the combination of live body human face identification technology and facial expression identification technology may prevent others from impersonating users with cell phone images, videos, photos, masks, and 3D (3 Dimensions) printed heads etc.; It may further reduce the risk of funds being stolen by others without warning, and it may also effectively distinguish two or more similar-looking users; it may greatly prevent the risk of fraudulent use of identity without the willingness of the person; and it may effectively prevent twins and other similar people from being confused.

Further, the user may also set an alarm expression. When the user is coerced to transfer assets, the alarm expression may be used when collecting human face information, and the system may implement a police reporting operation based on the alarm expression, thereby improving the user's personal safety and property safety.

Figure 4:
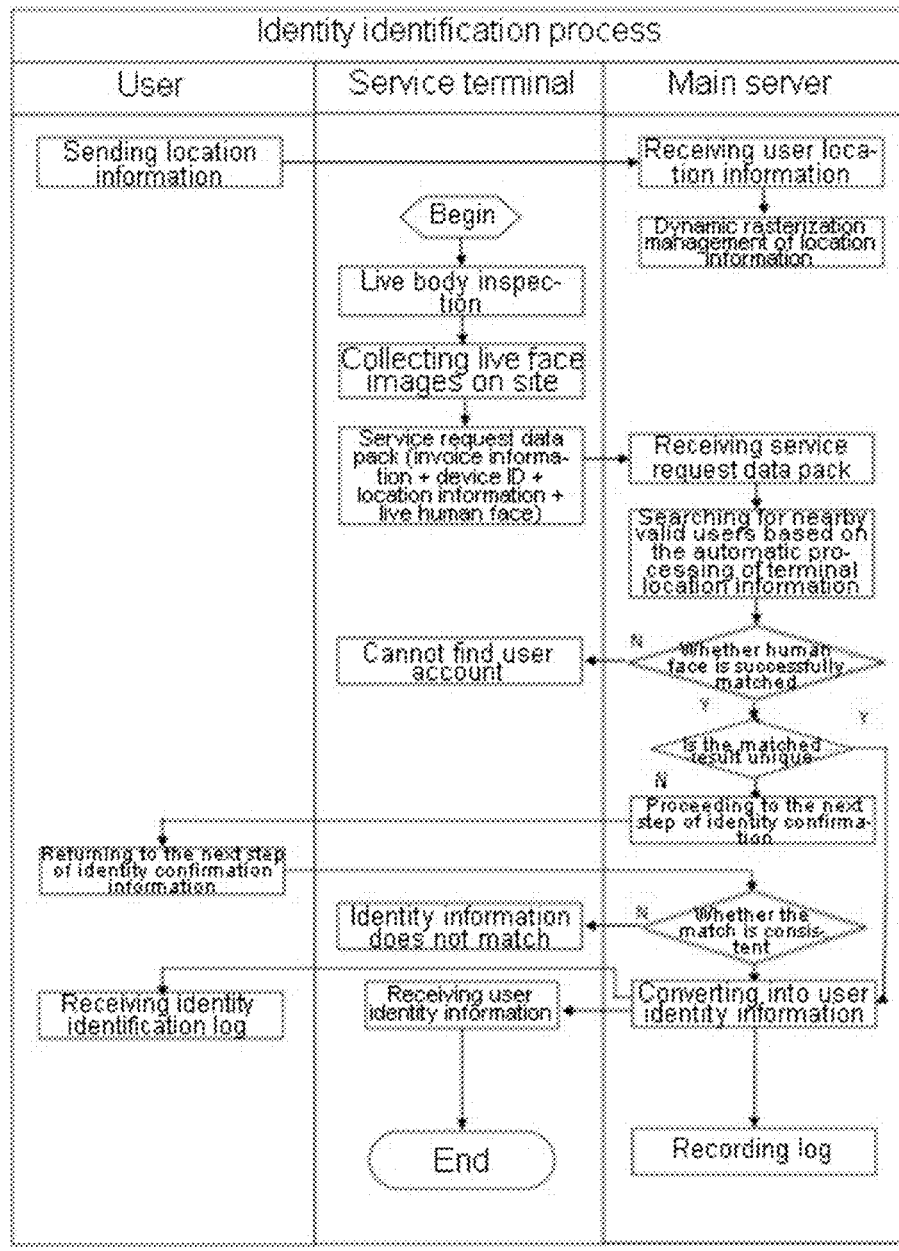
FIG. 4 is a flowchart of another identity identification method based on dynamic rasterization management provided by an embodiment of the application.

Referring to a flowchart of an identity identification method based on dynamic rasterization management of FIG. 4, the method uses as example identity authentication based on identity identification, the method comprises the following steps:

After the identity identification is completed, the identity identification result and service request are sent to the identity authentication system, so that the identity authentication system converts the identity identification result into personal identity information, and completes identity authentication according to the personal identity information and service request.

Specifically, the user's associated terminal sends the user's location information to the system in real time, so that the system updates the grid area where the user is located based on the user's location information. When a user needs to perform identity authentication, the service terminal configured for authentication first performs a live body detection on the user, and then collects the user's live body human face image, and according to the device ID (Identity, identification number), device type, location information and live body human face information generates a service request data pack, and sends the service request data pack to the system. After receiving the service request data pack, the system searches for effective users nearby based on the location information in the service request data pack, and matches the live body human face in the service request data pack with the human face in the system. When the match is unsuccessful, it will return "User Account Not Found" to the service terminal of the merchant and end the authentication; when the match is successful, it will be determined whether the matching result is unique. If unique, obtain the identity information corresponding to the biological characteristic information; if it is not unique, proceed to the next step of identity confirmation, and send the identity confirmation information to all users successfully matched. After receiving the identity information returned by the user's associated terminal, it is matched with the identity information of the above-mentioned users. If the matching is unsuccessful, send "Identity Information Does Not Match" to the service terminal, and end the identity authentication; when the matching is successful, send the identity information sent by the user's associated terminal to the service terminal, so that the service terminal completes identity authentication based on the identity information.

The embodiment of the present application uses human face identification technology to authenticate the user's identity, without requiring the user to provide a physical identity document etc., so that the identity authentication process is further simplified. At the same time, because there is no need to carry identity documents, it is convenient for users to travel while reducing the risk of losing identity documents.

Figure 5:
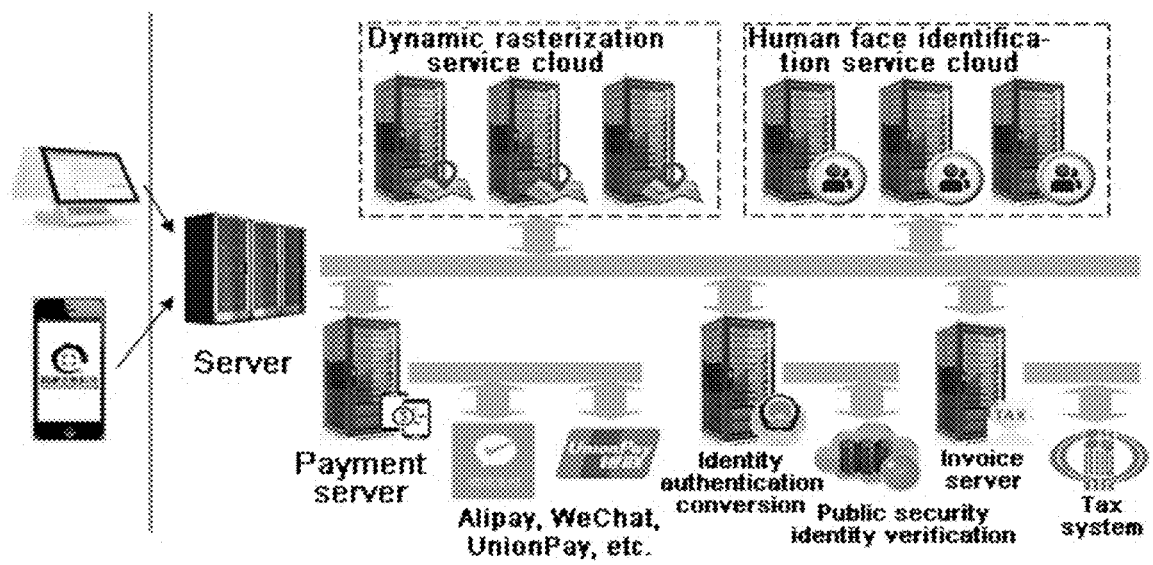
FIG. 5 is an illustrative structural diagram of a system provided by an embodiment of this application.

Further, referring to the illustrative structural diagram of a system of FIG. 5, the system comprises a main server, and a dynamic grid service cloud, a human face identification service cloud, a payment server, an identity authentication server, and an invoice server respectively connected to the main server; wherein the main server is configured to realize the communication between the payment server, the identity authentication server, the invoice server, each service cloud and the service terminal and the associated terminal of the user. The dynamic grid service cloud is configured to determine the grid area where the user and the service terminal are located. The human face identification cloud is configured to match the human face information corresponding to the user. The payment server may be connected to other payment platforms and configured to complete payment. The identity authentication server may be connected to related departments and configured to complete identity authentication, and the invoice server may be connected to related departments and configured to complete the task of invoice issuance.

In summary, the embodiments of this application may achieve at least one of the following features:

(1) The operation is simple and convenient. When a unique valid user is matched in the system, the user does not need to take out a mobile phone, and only rely on scanning biological characteristics for identity identification, which reduces the operation steps and is simpler, more convenient and faster.

(2) Guarantee accuracy. The embodiments of this application rely on the existing high-precision biological identification technology, and through real-time dynamic rasterization management, greatly reduce the number of biological characteristics that need to be searched, greatly guarantee the accuracy of comparison, and prevent economic disputes caused by wrong determination.

(3) Improve speed and reduce costs. Due to the real-time dynamic rasterization area management, the number of biological characteristics that need to be searched is greatly reduced, the comparison speed is greatly increased, and the millisecond level may be achieved; and equipment investment is reduced, and investment cost and maintenance difficulty are greatly reduced.

(4) Cross-regional payment at any time. Using location information and dynamic grid management technology, when a user moves from one area to another, the dynamic grid management will automatically move the user from one grid area to another grid area, so the user may pay immediately in another area without any manual setting, so as to realize mobile payment anytime, anywhere.

(5) Prevent remote fraudulent use of identity. Since the accuracy of AGPS is up to 2 kilometers, and the accuracy of GPS may be 10 meters, the effective range may be controlled within a radius of 3 kilometers through AGPS, and the effective range may be controlled within a radius of 15 meters when using GPS. This may effectively prevent illegal users outside the effective range from fraudulently using user information, and avoid a large number of illegal activities that use information fraudulently.

(6) Assist police in solving cases quickly. Due to the dynamic rasterization management technology, in the event of coerced transfer of assets and pursuit of escapees, the user may be found in the shortest time through the user's location information, and the case may be solved quickly.

(7) Achieve a live circle without mobile phones in the grid. In the grid area where the user's mobile phone is located and its adjacent grid area, the user may complete payment and identity authentication without carrying the mobile phone.

(8) It is convenient for users to travel. Through dynamic rasterization management and live body biological characteristic technology for identity authentication, identity authentication may be realized without physical identity documents, and transportation ticket purchases, airport gates, hotel check-in and entry-exit etc. may be realised without physical identity documents which greatly facilitate a user's travel.

(9) Prevent fraudulent use of identity. Using live body biological technology may prevent identity from being counterfeited. Taking human faces as an example, using live body human face identification technology may prevent others from impersonating users with mobile phone images, videos, photos, masks, and 3D (3 Dimensions) printed heads.

(10) Prevent theft of funds. When the biological identification used is human face identification, facial expression identification technology may be used together. Unless a user consciously makes the facial expression bound to the payment operation and is collected, the user's mobile payment action cannot be performed, which may effectively prevent users from being fraudulently used and with funds stolen under normal conditions, sleep, drunkenness, coma, and death etc.

(11) Effectively prevent the identity confusion of twins. Using facial expression identification technology, since everyone may customize their payment expressions according to their personal preferences, even though they look similar, the payment expressions are different. Therefore, it may further effectively prevent identity confusion of twins and other people with similar looks.

(12) Ensure the safety of account funds. When a mobile phone is lost or the mobile phone number is obtained by others, due to the combined use of live body biological characteristic technology and even combined with facial expression identification technology, payment operations cannot be performed unless the user personally operates it, thereby better ensuring the security of account funds.

(13) Alarm expression. Using facial expression identification technology, one may set an alarm expression while setting a valid payment expression. When making a payment, if an alarm expression is shown, at the same time that the payment operation is processed accordingly, a nearest police report will be processed to prevent the transfer of assets by criminals and prevent personal safety from being threatened.

Figure 6:
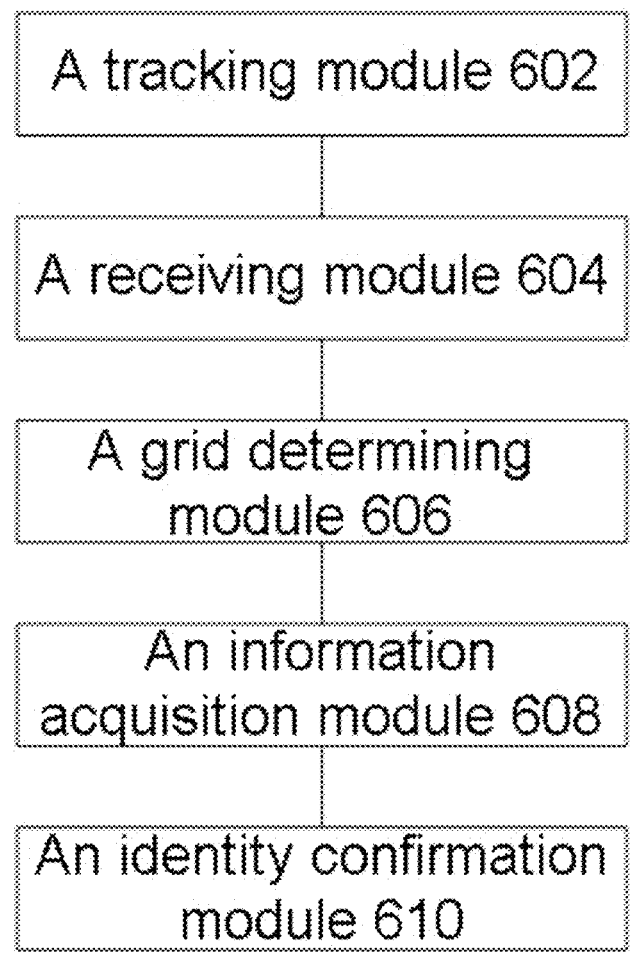
FIG. 6 is an illustrative structural diagram of an identity identification device based on dynamic rasterization management provided by an embodiment of the application.

Regarding the identity identification method based on dynamic rasterization management provided in the foregoing embodiment, an embodiment of the present application also provides an identity identification device based on dynamic rasterization management. Referring to an illustrative structural diagram of an identity identification device based on dynamic rasterization management of FIG. 6, the device comprises the following steps:

A tracking module 602 configured to track a current location of each user to determine a current grid area each user is located.

A receiving module 604 configured to receive an identification request sent by a service terminal; wherein the identification request comprises first location information and live body biological characteristic information of a target object.

A grid determining module 606 configured to determine a first grid area where the service terminal is located based on the first location information.

An information acquisition module 608 configured to obtain biological characteristic information of each user with respective current grid area being the first grid area;

An identity confirmation module 610 configured to complete an identity identification according to the live body biological characteristic information of the target object and the biological characteristic information of each user in the first grid area.

In the identity identification device based on dynamic rasterization management provided by the embodiment of the application, a tracking module tracks a current location of the user in real time to determine a current grid area where each user is located, and a receiving module receives an identification request sent by a service terminal to obtain first location information, and a grid determination module determines the first grid area of the service terminal according to the first location information, and then an information acquisition module obtains the biological characteristic information of all users whose current grid area is the first grid area, and then an identity confirmation module completes identity identification according to the biological characteristic information of the target object and the biological characteristic information of the above-mentioned users. The embodiments of this application identify the user's identity through the user's live body biological characteristic information, without the need for the user to provide information such as passwords, two-dimensional codes, or identification documents, which may effectively simplify the process of identity identification and improve the user's experience when performing identity identification. In addition, because the user does not need to provide the above information, it may reduce the risk of fraudulent use of passwords and two-dimensional codes and loss of identity documents etc., and further improve the security of identity identification. At the same time, the use of live body biological characteristic information may further improve the security of identity identification.

The implementation principles and technical effects of the device provided in the embodiments of the application are the same as those of the foregoing method embodiments. For a brief description, for the parts not mentioned in the device embodiments, please refer to the corresponding content in the foregoing method embodiments.

The device is a type of server. Specifically, the server comprises a processor and a storage device; the storage device stores a computer program, and the computer program executes the method described in any one of the above embodiments when the computer program is run by the processor.

Figure 7:
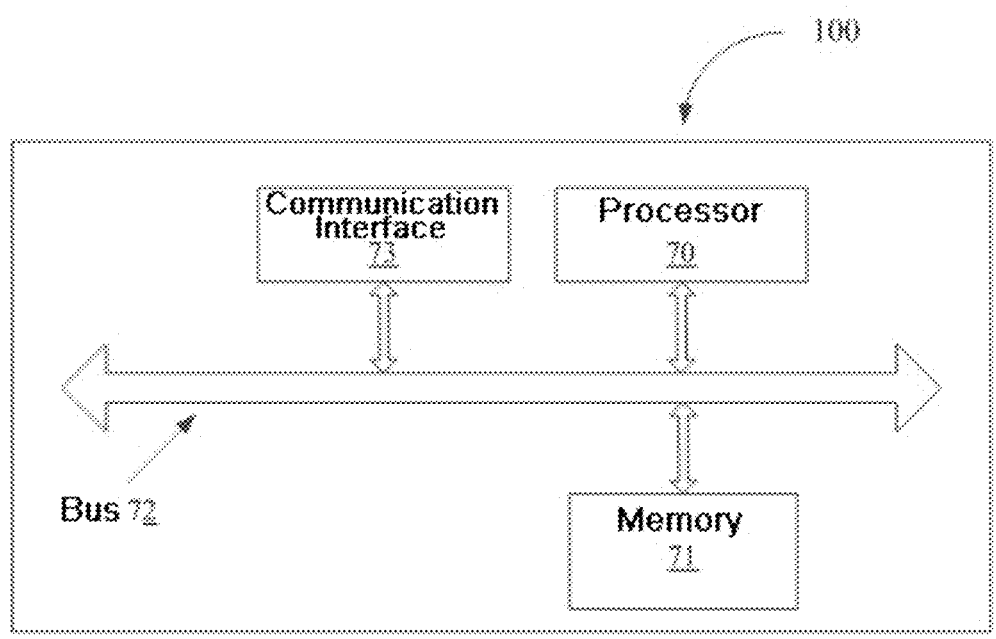
FIG. 7 is an illustrative structural diagram of a server provided by an embodiment of the application.

FIG. 7 is an illustrative structural diagram of a server provided by an embodiment of the application. The server 100 comprises a processor 70, a memory 71, a bus 72 and a communication interface 73, and the processor 70, the communication interface 73 and the memory 71 are connected by the bus 72; the processor 70 is configured to execute an executable module stored in the memory 71, such as a computer program.

Among them, the memory 71 may comprise a high-speed Random Access Memory (RAM), and may also comprise a non-volatile memory, for example, at least one disk memory. The communication connection between the network element of the system and at least one other network element is realized through at least one communication interface 73 (which may be wired or wireless), and the Internet, a wide area network, a local network, a metropolitan area network etc. may be used.

The bus 72 may be an ISA bus, a PCI bus, an EISA bus etc. The bus may be divided into address bus, data bus and control bus. For ease of presentation, only one bidirectional arrow is used in FIG. 7, but it does not mean that there is only one bus or one type of bus.

Among them, the memory 71 is used to store a program, and the processor 70 executes the program after receiving an execution instruction. The method executed by the flow process defined apparatus disclosed in any of the foregoing embodiments of the present application may be applied to the processor 70, or implemented by the processor 70.

The processor 70 may be an integrated circuit chip with signal processing capabilities. In the implementation process, the steps of the foregoing method may be completed by an integrated logic circuit of hardware in the processor 70 or instructions in the form of software. The aforementioned processor 70 may be a general-purpose processor, including a central processing unit (CPU for short), a network processor (NP) etc.; it may also be a digital signal processor (DSP for short), Application Specific Integrated Circuit (ASIC for short), Field-Programmable Gate Array (FPGA) or other programmable logic devices, discrete gates or transistor logic devices, and discrete hardware components. The methods, steps, and logical block diagrams disclosed in the embodiments of the present application may be implemented or executed. The general-purpose processor may be a microprocessor or the processor may also be any conventional processor etc. The steps of the method disclosed in the embodiments of the present application may be directly embodied as being executed by a hardware decoding processor or by a combination of hardware and software modules in the decoding processor. The software module may be located in random access memory, flash memory or read-only memory, programmable read-only memory or electrically erasable programmable memory and registers and other mature storage media in the field. The storage medium is located in the memory 71, and the processor 70 reads the information in the memory 71, and completes the steps of the above method in combination with its hardware.

The computer program product of the identity identification method, device and server based on dynamic rasterization management provided by the embodiments of the present application comprise a computer-readable storage medium storing non-volatile program code executable by a processor, and a computer program is stored on the computer-readable storage medium, which executes the method described in the previous method embodiment when the computer program is run by the processor. For specific implementation, please refer to the method embodiments, which will not be repeated here.

Those skilled in the art may clearly understand that for the convenience and conciseness of the description, the specific working process of the system described above may refer to the corresponding process in the foregoing embodiments, which will not be repeated here.

The computer program product of the readable storage medium provided by the embodiment of the present application includes a computer readable storage medium storing program code. The instructions included in the program code may be used to execute the method in the previous method embodiments. For specific implementation, please refer to the method embodiments, which will not be repeated here.

If the function is implemented in the form of a software functional unit and sold or used as an independent product, it may be stored in a computer readable storage medium. Based on this understanding, the technical solution of the present application essentially or the part that contributes to the existing technology or the part of the technical solution may be embodied in the form of a software product, and the computer software product is stored in a storage medium, including several instructions to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disks or optical disks and other media that may store program codes.

Finally, it should be noted that the above-mentioned embodiments are only specific implementations of this application, which are used to illustrate the technical solution of this application, rather than limiting it. The scope of protection of the application is not limited to this, although the application has been described in detail with reference to the foregoing embodiments, and those of ordinary skill in the art should understand that any person skilled in the art familiar with the technical field within the technical scope disclosed in this application may still modify the technical solutions described in the foregoing embodiments or may easily think of changes or equivalently replace some of the technical features. However, these modifications, changes or replacements do not cause the essence of the corresponding technical solutions to deviate from the spirit and scope of the technical solutions of the embodiments of the present application, and should be covered within the protection scope of the present application. Therefore, the protection scope of this application should be subject to the protection scope of the claims.

The invention claimed is:

1. An identity identification method based on dynamic rasterization management comprising:
   tracking a current location of each user to determine a current grid area each user is located;
   receiving an identification request sent by a service terminal; wherein the identification request comprises first location information and biological characteristic information of a target object;
   determining a first grid area where the service terminal is located based on the first location information;
   obtaining biological characteristic information of each user with respective current grid area being the first grid area;
   determining whether the biological characteristic information of the target object is directly from a real user;
   if yes, performing a biological characteristic matching on the target object and each user in the first grid area according to the biological characteristic information of the target object and the biological characteristic information of each user in the first grid area;
   determining whether the biological characteristic matching is successful matched;
   if not, obtaining each second grid area adjacent to the first grid area, and obtaining biological characteristic information of each user in each of the second grid areas;
   completing the identity identification according to the biological characteristic information of the target object and the biological characteristic information of each user in each second grid area;
   performing the biological characteristic matching on the target object and each user in each second grid area according to the biological characteristic information of the target object and the biological characteristic information of each user in each the second grid area;
   determining whether the biological characteristic matching is successful matched;
   when the biological characteristic matching is successful matched, determining whether a user successfully matched is unique,
   when the user successfully matched is unique, determining the matched user as e target object, and completing the identity identification;
   when the user successfully matched is not unique, sending an identity confirmation request to an associated terminal of each user successfully matched;
   when receiving at least one identity information sent by the associated terminal of each user successfully matched for the identity confirmation request, determining the identity information sent by the associated terminal of each user to obtain a determination result;
   completing the identity identification according to the determination result,
   wherein, when an user density in the first grid area is higher than a threshold, a high-precision location request is generated, so that the associated terminal of the user returns high-precision location information based on the high-precision location request, and sends the high-precision location information to a grid server corresponding to the first grid area, so that the grid server determines the sub-grid area or sub-sub-grid area where the target object is located according to high-precision location information; and when the user density of the first grid area is smaller than a threshold, a low-precision location request is generated, so that the associated terminal of the user returns low-precision location information based on the low-precision location request.

2. The method according to claim 1, further comprising:
after completing the identity identification, sending an identity identification result and a service request to a payment system, so that the payment system searches for a payment account corresponding to the identity identification result, and completes a payment operation based on the payment account and the service request, and returns a result of the payment operation;
receiving the result of the payment operation returned by the payment system, generating and sending an invoice service request according to the payment operation to an invoice system, so that the invoice system generates a payment invoice, and sending the payment invoice by email to an email address designated by the target object, and/or to the service terminal.

3. The method according to claim 1, further comprising:
after completing the identity identification, sending an identity identification result and a service request to an identity authentication system, so that the identity authentication system converts the identity identification result into personal identity information, and completing an identity authentication based on the personal identity information and the service request.

4. The method according to claim 1, further comprising:
generating an identity identification log, and sending the identity identification log to the associated terminal of the target object to prompt a completion of the identity identification of the target object.

5. The method according to claim 1 further comprising:
when the biological characteristic information is a human face biological characteristic information, the human face biological characteristic information comprises human face biological characteristic information of the target object or combines the human face biological characteristic information and the facial expression information of the target object.

6. An identity identification device based on dynamic rasterization management comprising:
a tracking module configured to track a current location of each user to determine a current grid area each user is located;
a receiving module configured to receive an identification request sent by a service terminal; wherein the identification request comprises first location information and live body biological characteristic information of a target object;
a grid determining module configured to determine a first grid area where the service terminal is located based on the first location information;
an information acquisition module configured to obtain biological characteristic information of each user with respective current grid area being the first grid area;
an identity confirmation module configured to complete an identity identification according to the biological characteristic information of the target object and the biological characteristic information of each user in the first grid area, the identity confirmation module is further configured for:
determining whether the biological characteristic information of the target object is directly from a real user;
if yes, performing a biological characteristic matching on the target object and each user in the first grid area according to the biological characteristic information of the target object and the biological characteristic information of each user in the first grid area:
determining whether the biological characteristic matching is successful matched;
if not, obtaining each second grid area adjacent to the first grid area, and obtaining biological characteristic information of each user in each of the second grid areas;
completing the identity identification according to the biological characteristic information of the target object and the biological characteristic information of each user in each second grid area;
performing the biological characteristic matching on the target object and each user in each second grid area according to the biological characteristic information of the target object and the biological characteristic information of each user in each the second grid area;
determining whether the biological characteristic matching is successful matched;
when the biological characteristic matching is successful matched, determining whether a user successfully matched is unique;
when the user successfully matched is unique, determining the matched user as the target object, and completing the identity identification;
when the user successfully matched is not unique, sending an identity confirmation request to an associated terminal of each user successfully matched;
when receiving at least one identity information sent by the associated terminal of each user successfully matched for the identity confirmation request, determining the identity information sent by the associated terminal of each user to obtain a determination result;
completing the identity identification according to the determination result,
wherein, when an user density in the first grid area is higher than a threshold, a high-precision location request is generated so that the associated terminal of the user returns high-precision location information based on the high-precision location request, and sends the high-precision location information to a grid server corresponding to the first grid area, so that the grid server determines the sub-grid area or sub-sub-grid area where the target object is located according to high-precision location information; and
when the user density of the first grid area is smaller than a threshold, a low-precision location request is generated, so that the associated terminal of the user returns low-precision location information based on the low-precision location request.

7. A server comprising:
a processor;
a memory; and
a computer program stored in the memory, the computer program including instructions causing the processor to execute a method comprising:
tracking a current location of each user to determine a current grid area each user is located;

receiving an identification request sent by a service terminal; wherein the identification request comprises first location information and biological characteristic information of a target object;

determining a first grid area where the service terminal is located based on the first location information;

obtaining biological characteristic information of each user with respective current grid area being the first grid area;

determining whether the biological characteristic information of the target object is directly from a real user;

if yes, performing a biological characteristic matching on the target object and each user in the first grid area according to the biological characteristic information of the target object and the biological characteristic information of each user in the first grid area;

determining whether the biological characteristic matching is successful matched;

if not, obtaining each second grid area adjacent to the first grid area, and obtaining biological characteristic information of each user in each of the second grid areas;

completing the identity identification according to the biological characteristic information of the target object and the biological characteristic information of each user in each second grid area;

performing the biological characteristic matching on the target object and each user in each second grid area according to the biological characteristic information of the target object and the biological characteristic information of each user in each the second grid area;

determining whether the biological characteristic matching is successful matched;

when the biological characteristic matching is successful matched, determining whether a user successfully matched is unique;

when the user successfully matched is unique, determining the matched user as the target object, and completing the identity identification;

when the user successfully matched is not unique, sending an identity confirmation request to an associated terminal of each user successfully matched;

when receiving at least one identity information sent by the associated terminal of each user successfully matched for the identity confirmation request, determining the identity information sent by the associated terminal of each user to obtain a determination result;

completing the identity identification according to the determination result, wherein, when an user density in the first grid area is higher than a threshold, a high-precision location request is generated, so that the associated terminal of the user returns high-precision location information based on the high-precision location request, and sends the high-precision location information to a grid server corresponding to the first grid area, so that the grid server determines the sub-grid area or sub-sub-grid area where the target object is located according to high-precision location information; and when the user density of the first grid area is smaller than a threshold, a low precision location request is generated, so that the associated terminal of the user returns low-precision location information based on the low-precision location request.

8. The server according to claim 7, wherein the instructions further comprises:

after completing the identity identification, sending an identity identification result and a service request to a payment system, so that the payment system searches for a payment account corresponding to the identity identification result, and completes a payment operation based on the payment account and the service request, and returns a result of the payment operation;

receiving the result of the payment operation returned by the payment system, generating and sending an invoice service request according to the payment operation to an invoice system, so that the invoice system generates a payment invoice, and sending the payment invoice by email to an email address designated by the target object, and/or to the service terminal.

9. The server according to claim 7, wherein the instructions further comprises:

after completing the identity identification, sending an identity identification result and a service request to an identity authentication system, so that the identity authentication system converts the identity identification result into personal identity information, and completing an identity authentication based on the personal identity information and the service request.

10. The server according to claim 7, wherein the instructions further comprises:

generating an identity identification log, and sending the identity identification log to the associated terminal of the target object to prompt a completion of the identity identification of the target object.

11. The server according to claim 7, wherein the instructions further comprises:

when the biological characteristic information is a human face biological characteristic information, the human face biological characteristic information comprises the human face biological characteristic information of the target object or combines the human face biological characteristic information and the facial expression information of the target object.

12. A non-transitory computer readable medium program code executable by a processor, wherein the program code includes instructions causing the processor to execute a method comprising: tracking a current location of each user to determine a current grid area each user is located: receiving an identification request sent by a service terminal; wherein the identification request comprises first location information and biological characteristic information of a target object: determining a first grid area where the service terminal is located based on the first location information: obtaining biological characteristic information of each user with respective current grid area being the first grid area: determining whether the biological characteristic information of the target object is directly from a real user:

if yes, performing a biological characteristic matching on the target object and each user in the first grid area according to the biological characteristic information of the target object and the biological characteristic information of each user in the first grid area;

determining whether the biological characteristic matching is successful matched:

if not, obtaining each second grid area adjacent to the first grid area, and obtaining biological characteristic information of each user in each of the second grid areas:

completing the identity identification according to the biological characteristic information of the target object and the biological characteristic Information of each user in each second grid area:

performing the biological characteristic matching on the target object and each user in each second grid area according to the biological characteristic information of the target object and the biological characteristic information of each user in each the second grid area:

determining whether the biological characteristic matching is successful matched: when the biological characteristic matching is successful matched, determining whether a user successfully matched is unique: when the user successfully matched is unique, determining the matched user as the target object, and completing the identity identification;

when the user successfully matched is not unique, sending an identity confirmation request to an associated terminal of each user successfully matched: when receiving at least one identity information sent by the associated terminal of each user successfully matched for the identity confirmation request, determining the identity information sent by the associated terminal of each user to obtain a determination result: completing the identity identification according to the determination result, wherein, when an user density in the first grid area is higher than a threshold, a high-precision location request is generated, so that the associated terminal of the user returns high-precision location information based on the high-precision location request, and sends the high-precision location information to a grid server corresponding to the first grid area, so that the grid server determines the sub-grid area or sub-sub-grid area where the target object is located according to high-precision location information, and when the user density of the first grid area is smaller than a threshold, a low-precision location request is generated, so that the associated terminal of the user returns low-precision location information based on the low-precision location request.

13. The computer-readable medium according to claim 12, wherein the instructions further comprises:

after completing the identity identification, sending an identity identification result and a service request to a payment system, so that the payment system searches for a payment account corresponding to the identity identification result, and completes a payment operation based on the payment account and the service request, and returns a result of the payment operation;

receiving the result of the payment operation returned by the payment system, generating and sending an invoice service request according to the payment operation to an invoice system, so that the invoice system generates a payment invoice, and sending the payment invoice by email to an email address designated by the target object, and/or to the service terminal.

14. The computer-readable medium according to claim 12, wherein the instructions further comprises:

after completing the identity identification, sending an identity identification result and a service request to an identity authentication system, so that the identity authentication system converts the identity identification result into personal identity information, and completing an identity authentication based on the personal identity information and the service request.

15. The computer-readable medium according to claim 12, wherein the instructions further comprises:

generating an identity identification log, and sending the identity identification log to the associated terminal of the target object to prompt a completion of the identity identification of the target object.

16. The computer-readable medium according to claim 12, wherein the instructions further comprises:

when the biological characteristic information is a human face biological characteristic information, the human face biological characteristic information comprises the human face biological characteristic information of the target object or combines the human face biological characteristic information and the facial expression information of the target object.

* * * * *